United States Patent [19]

Kotthaus et al.

[11] Patent Number: 4,910,922
[45] Date of Patent: Mar. 27, 1990

[54] METHOD OF GRINDING THE TEETH OF BEVEL GEARS HAVING LONGITUDINALLY CURVED TEETH

[75] Inventors: Erich Kotthaus, Hückeswagen, Fed. Rep. of Germany; Otto Hildinger, Schwerzenbach, Switzerland

[73] Assignee: Werkzeugmaschinenfabrik Oerlikon-Bührle, Zürich, Switzerland

[21] Appl. No.: 245,289

[22] Filed: Sep. 16, 1988

Related U.S. Application Data

[62] Division of Ser. No. 936,155, Dec. 1, 1986, Pat. No. 4,799,337.

[30] Foreign Application Priority Data

Dec. 13, 1985 [CH] Switzerland ............................ 330/85
Aug. 11, 1986 [CH] Switzerland ............................ 195/86

[51] Int. Cl.⁴ ............................................. B24B 19/00
[52] U.S. Cl. ............................. 51/105 GG; 51/123 G; 51/287; 51/26; 409/29
[58] Field of Search ......... 51/26, 33 W, 52 R, 52 HB, 51/105 HB, 105 G, 123 G, 165 R, 165.71, 165.77, 287; 409/26, 29, 49, 51

[56] References Cited

U.S. PATENT DOCUMENTS

| | | | |
|---|---|---|---|
| 2,947,120 | 8/1960 | Bauer et al. | 51/287 X |
| 3,286,408 | 11/1966 | Lantz | 51/26 X |
| 3,879,898 | 4/1975 | Loxham et al. | 51/33 W |
| 3,992,937 | 11/1976 | Jaeger et al. | 51/26 X |
| 4,195,446 | 4/1980 | Angst | 51/123 G X |
| 4,617,761 | 10/1986 | Miyatake et al. | 51/165.71 X |
| 4,631,869 | 12/1986 | Miyatake et al. | 51/165.71 |
| 4,635,404 | 1/1987 | Wirz | 51/287 X |

FOREIGN PATENT DOCUMENTS 2155372 3/1984 United Kingdom ................. 51/287

*Primary Examiner*—Robert P. Olszewski
*Attorney, Agent, or Firm*—Werner W. Kleeman

[57] ABSTRACT

The apparatus for grinding rough-cut longitudinally curved gear teeth of a helical bevel gear, comprises two spindles for respectively mounting a tool and a workpiece, and structure for translatably and adjustably arranging at least one spindle of these two spindles. A separate electric motor arranged coaxially with each of the two spindles serves for driving the tool and for driving the workpiece, respectively. The separate electric motors are mutually interconnected by an electric shaft.

2 Claims, 11 Drawing Sheets

METHOD OF GRINDING THE TEETH OF BEVEL GEARS HAVING LONGITUDINALLY CURVED TEETH

CROSS-REFERENCE TO RELATED CASES

This application is a divisional of the commonly assigned, co-pending U.S. application Ser. No. 06/936,155, filed Dec. 1, 1986 and entitled "METHOD OF GRINDING THE TEETH OF BEVEL GEARS HAVING LONGITUDINALLY CURVED TEETH" now U.S. Pat. No. 4,799,377, granted Jan. 24, 1989.

BACKGROUND OF THE INVENTION

The present invention broadly relates to the fabrication of gear teeth on a bevel gear and, more specifically, pertains to a new and improved method, apparatus and tool for finish machining rough machined teeth of hypoid gears.

Generally speaking, a primary method of the present invention is for grinding rough-cut longitudinally curved gear teeth of a bevel gear blank by means of a tool driven in rotation about a tool axis and entailing the performance of at least one relative feed motion between the bevel gear blank and the tool.

In other words, the primary method of the present invention is for fabricating gear teeth on a bevel gear and comprises the steps of rough machining a bevel gear blank with a first axis of rotation and a first number of longitudinally curved teeth each having a longitudinally convex tooth flank and each having a longitudinally concave tooth flank while leaving a finish machining allowance on each longitudinally concave tooth flank and on each longitudinally convex tooth flank and arranging the rough machined bevel gear blank with the first axis of rotation in a hypoidally displaced relationship to a second axis of rotation of a rotary form tool.

The tool of the present invention is for grinding rough-cut longitudinally curved gear teeth of a bevel gear blank and has a conoidally helical form. The tool comprises teeth and each tooth of the teeth has a concave tooth flank and a convex tooth flank.

In other words, the tool of the present invention is a rotary form tool for finish machining tooth flanks of a first number of longitudinally curved teeth of a rough machined bevel gear blank for a hypoid gear pair.

The apparatus of the present invention is for grinding rough-cut longitudinally curved gear teeth of a helical bevel gear.

In other words, the apparatus of the present invention is for finish machining tooth flanks of a first number of longitudinally curved teeth of a rough machined bevel gear blank for a hypoid gear pair by means of a rotary form tool. The apparatus comprises a first spindle for mounting the rough machined bevel gear blank and a second spindle for mounting the rotary form tool. Means are provided for translatably adjusting at least one spindle of the first spindle and the second spindle.

A further method of the present invention is for using the inventive apparatus for finish machining tooth flanks of a first number of longitudinally curved teeth of a rough machined bevel gear blank for a hypoid gear pair by means of a rotary form tool having a second number of gear teeth and comprises the steps of mounting the rough machined bevel gear blank in a first spindle of the apparatus, employing as the rotary form tool a rotary form tool having a second number of teeth and at least one abrading surface and mounting the rotary form tool in a second spindle of the apparatus.

A still further method of the present invention is for fabricating a tool.

In other words, the still further method of the present invention is for fabricating a rotary form tool having a first axis of rotation and a first number of gear teeth for finish machining a rough machined helical bevel gear having a second axis of rotation and a second number of longitudinally curved teeth. The method comprises the steps of initially fabricating a master gear also having the first axis of rotation and corresponding to the rough machined helical bevel gear to be finish machined.

Yet a further method of the present invention is for fabricating a tool and comprises the steps of setting up data programs for associated rough-cut tools and fabricating the rough-cut tools in accordance with the set-up data programs.

In other words, the yet further method of the present invention is for fabricating a rotary form tool for finish machining a rough machined bevel gear blank. The method comprises the steps of generating a first set of dimensional data relating to the configuration of a hypoid gear master corresponding to the rough machined bevel gear blank to be finish machined.

In this specification it is to be understood that a bevel or hypoid gear pair or set or transmission comprises two bevel gears, a so-called pinion gear (usually smaller and driving) and a so-called crown or ring gear (usually larger and driven).

The manufacturing process for fabricating bevel gears and hypoid gear transmissions to be prefatorily described hereinbelow has proven its mettle both economically and qualitatively: cutting gear teeth by milling or shaping; case-hardening; and pairwise lapping. The general result is a gear pair comprising a pinion gear and a ring or crown gear which must both be marked as members of a matched pair during lapping to ensure correct installation later. The inevitable hardening distortion and its ensuing diminution of quality have always caused difficulties. Pairwise lapping reduces or eliminates individual pitch errors for improving quiet running of the gear set and for finishing the tooth flank surfaces, but radial and axial run-out errors persist. If such radial and axial run-out errors cannot be accommodated or tolerated, more suitable finish machining processes must be employed.

In the mass production of gear transmissions, especially for automobile and heavy vehicle production, cylindrical spur gears are, for instance, rough cut by milling before hardening; usually shaving or hobbing before hardening; and subsequently hardening. The quality thus attained meets the specified requirements, since hardening distortion in cylindrical gears is slight and the involute toothing employed is relatively insensitive to radial run-out errors. The arcuately-tooth bevel gears usually employed in such gear transmissions are fabricated as initially described and installed in matched pairs without detriment to the quality level of the gear transmission already established by the cylindrical gears. In order to achieve greater economy, it is desired to eliminate the fixed pairing or matching of pinion and crown gear in bevel gear sets, i.e. it is desired to eliminate hardening distortion when fine processing or finish machining bevel gear toothing or, respectively, to render distortion retrogressive after hardening.

It has long been known in practice that the toothing of bevel gears fabricated by rough cutting in the unhardened state according to the indexing method, that is bevel gears having circularly arcuate teeth, can also be ground with dished grinding wheels according to the indexing method after case hardening. This method is employed especially when utmost requirements are demanded of the gear transmission, such as in rotor drives for helicopters. In such applications, the considerably higher fabrication costs are of secondary importance. A method for crowning longitudinally curved teeth of gears fabricated according to the continuous cutting method is known from the European Patent No. 0,022,586, published Jan. 21, 1981, and the cognate U.S. Pat. No. 4,467,567, granted Aug. 28, 1984. Both of these fine processing or finish machining methods are, however, not suited for employment in mass production, especially in automotive vehicle production, for economic reasons.

A dished or cupped grinding wheel with two conical grinding flanks for grinding helically or arcuately toothed bevel gears according to the indexing generating method is known from the German Patent No. 2,721,164, published Oct. 29, 1981. The grinding flanks confront one another and thus form a recessed inner annulus of frustro-conical cross-section.

A corresponding design of machine is described in the article "Schleifen bogenverzahnter Kegelräder in der Kleinserienfertigung" in the Technical Journal *Werkstatt und Betrieb*, No. 118, October 1985, pages 703 to 705. The introduction to this article indicates that there had heretofore been no possibility of grinding the flanks of arcuately toothed bevel gears economically in small lots. The machine described in the article permits grinding axially displaced and non-axially displaced bevel gears with the dished or cupped grinding wheel. The process employs the indexing generating method tooth for tooth. This process is therefore especially suited for finishing bevel gears having teeth rough cut according to the indexing generating method, i.e. circularly arcuately fabricated. Under certain conditions even bevel gears having rough cut teeth with epicycloidal or involute longitudinal flank lines can be finish ground to a circular arc. Should, however, the epicycloidal or involute form deviate too greatly from a circular arc, i.e. by more than a permissible amount of grinding allowance, then this method is no longer utilizable.

A further method for fine processing or finish machining hardened helical bevel gears by generating milling is known from the *wt-Zeitschrift fur industrielle Fertigung*, No. 75, 1985, pages 461 to 464. In this method spiral bevel gears rough cut according to the continuous generating milling method are finish milled subsequent to case hardening. The requisite cutting tools substantially correspond to those employed for milling before hardening, but the cutting edges comprise hard metal inserts for machining after hardening. The same machine and procedure can thus be employed for machining both before and after hardening. The hard metal inserts are preferably mounted as cutting edge strips provided with a coating of polycrystalline cubic boron nitride, also known as CBN or Borazon, on their top rake or cutting faces.

An apparatus for fine processing or finish machining of gears having a shaping or shaving wheel cutter or other gear-shaped tool is known from the German Patent No. 1,161,465. In this apparatus the workpiece and the tool roll, i.e. perform generating motions, upon one another in mesh and their axes intersect. The workpiece and the tool are each connected by a respective shaft to an associated master gear. That is, the shaving wheel and the associated master gear pair as well as the workpiece gear blank and the associated master pinion pair are each fixed against rotation on one and the same shaft. This apparatus is, however, only employed for machining straight-toothed gears or helically toothed cylindrical gears. This apparatus is not utilizable for fine processing or finish machining bevel gears having longitudinally curved teeth.

SUMMARY OF THE INVENTION

Therefore, with the foregoing in mind, it is a primary object of the present invention to provide a new and improved apparatus for finish machining bevel gears which does not exhibit the aforementioned drawbacks and shortcomings of the prior art constructions.

Another and more specific object of the present invention aims at providing a new and improved apparatus of the previously mentioned type for grinding bevel gears having longitudinally curved teeth and which can be economically employed, especially in both small production runs and large production runs.

Another more specific object of the present invention aims at providing a new and improved apparatus for performing the inventive method.

Yet a further significant object of the present invention aims at providing a new and improved construction of an apparatus of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the primary method of the present invention, among other things, is manifested by the features that it comprises the steps of: employing for the tool a helical bevel gear hypoidally related to the rough-cut longitudinally curved gear teeth to be ground of the bevel gear blank; the helical bevel gear having a predetermined number of teeth; each tooth of the predetermined number of teeth having at least one tooth flank provided with an abrading surface; arranging the helical bevel gear in a hypoidally displaced relationship to the rough-cut longitudinally curved gear teeth to be ground of the bevel gear blank; arranging the helical bevel gear in mesh with the rough-cut longitudinally curved gear teeth to be ground of the bevel gear blank; positively driving the helical bevel gear and the bevel gear blank in a synchronous relationship at rotary speeds proportional to their respective numbers of teeth; selecting the hypoidally displaced relationship of the helical bevel gear to the rough-cut longitudinally curved gear teeth to be ground of the bevel gear blank and selecting the rotary speeds such that a relative sliding velocity arising therebetween falls in the range of conventional or predetermined surface speeds for grinding; and continuously grinding in a single operation and with the at least one relative feed motion at least a selected set of the set of all concave tooth flanks and the set of all convex tooth flanks of the rough-cut longitudinally curved gear teeth to be ground of the bevel gear blank.

In other words, the primary method of the present invention comprises the steps of: employing as the rotary form tool a rotary form tool having the configuration of a helical bevel gear with a second number of gear teeth hypoidally related to the longitudinally curved teeth of the rough machined bevel gear blank in correspondence with the hypoidally displaced relationship of the first axis of rotation to the second axis of rotation and coated with an abrading medium on at least one tooth flank of the second number of gear teeth for removing the finish machining allowance; meshing the second number of gear teeth with the first number of longitudinally curved teeth of the bevel gear blank; rotating the rotary form tool about the second axis of rotation and the rough machined bevel gear blank about the first axis of rotation synchronously in the ratio of the first number of longitudinally curved teeth of the bevel gear blank to the second number of gear teeth of the rotary form tool; selecting the hypoidally displaced relationship of the first axis of rotation to the second axis of rotation and a rotary speed of the rotary form tool in relation to the hypoidally displaced relationship such that a relative sliding velocity arising between the longitudinally curved teeth and the gear teeth has a value within the range of conventional or predetermined surface speeds for abrading operations; and continuously abrading in a single operation at least a selected set of the set of all the longitudinal concave tooth flanks and the set of all the longitudinal convex tooth flanks while performing a predetermined feed motion of the rotary form tool relative to the bevel gear blank.

The tool of the present invention is manifested, among other things, by the features that at least one abrading surface is provided on at least a selected tooth flank of at least one concave tooth flank and at least one convex tooth flank; the bevel gear blank defining a workpiece; and the tool being designed for cooperation with the bevel gear blank with an axial displacement.

In other words, the rotary form tool of the present invention is manifested, among other things, by the features that it comprises a tool body having the configuration of a helical bevel gear with a second number of gear teeth hypoidally related to the first number of longitudinally curved teeth of the rough machined bevel gear blank; each tooth of the second number of gear teeth being helically curved and having a longitudinally concave tooth flank and a longitudinally convex tooth flank; and at least one tooth flank of the longitudinally concave tooth flanks and the longitudinally convex tooth flanks being coated with an abrading medium.

The apparatus of the present invention is manifested by the features that it comprises two spindles for mounting a tool and a workpiece, respectively, as well as means for translatably and adjustably arranging at least one spindle of the two spindles. The apparatus further comprises a separate electric motor arranged coaxially with each of the two spindles for driving the tool and for driving the workpiece, respectively, and means defining a so-called "electric shaft". The separate electric motors are mutually interconnected by the so-called "electric shaft".

In other words, the apparatus of the present invention, among other things, is manifested by the features that a first rotary drive means is arranged coaxial to the first spindle for driving the first spindle at a first speed of rotation and a second rotary drive means distinct from the first rotary drive means is arranged coaxial to the second spindle for driving the second spindle at a second speed of rotation. The apparatus comprises means interconnecting the first rotary drive means and the second rotary drive means for synchronizing the first speed of rotation and the second speed of rotation in a predeterminate ratio.

The further method of the present invention, among other things, is manifested by the features that it comprises the steps of: adjusting a selected one of the first spindle and the second spindle such that the rough machined bevel gear blank and the rotary form tool mesh such that the first axis of rotation and the second axis of rotation mutually define a hypoidally displaced relationship in which conjoint rotation of the first spindle and the second spindle produces relative sliding between tooth flanks of the rough machined bevel gear blank and the rotary form tool; selecting the hypoidally displaced relationship and a first speed of rotation for the second spindle such that the relative sliding has a velocity lying within the range of conventional or predetermined surface speeds for abrading operations; employing first rotary drive means to rotate the first spindle at the first speed of rotation; employing second rotary drive means conjointly with regulation means to rotate the second spindle in synchronism with the first spindle at a second speed of rotation related to the first speed of rotation by the ratio of the first number of longitudinally curved teeth to the second number of gear teeth; and effecting a relative feed motion between the first spindle and the second spindle.

The still further method of the present invention, among other things, is manifested by the features that it comprises the steps of: (a) coating tooth flanks of gear teeth of one gear of a hypoid gear transmission with an abrading medium; (b) grinding with the coated gear in the guise of a tool rough cut teeth of an associated tool in the guise of a workpiece; and (c) coating the rough cut and now ground teeth of the workpiece with an abrading medium.

In other words, the still further method of the present invention, among other things, is manifested by the features that it comprises the steps of: coating at least one tooth flank of the master gear with an abrading medium; fabricating a rough machined working rotary form tool blank having the configuration of a helical bevel gear with a first number of gear teeth hypoidally related to a second number of longitudinally curved teeth of the rough machined helical bevel gear to be finish machined; employing the coated master gear as a master rotary form tool to finish machine the rough machined working rotary form tool blank as a workpiece for producing a finish machined working rotary form tool by arranging the coated master gear with the first axis of rotation in an axially displaced relationship to the second axis of rotation of the rough machined working rotary form tool blank; meshing the first number of gear teeth with the second number of longitudinally curved teeth; rotating the master rotary form tool about the second axis of rotation and the rough machined working rotary form tool about the first axis of rotation synchronously in the ratio of the first number of gear teeth to the second number of longitudinally curved teeth; selecting the hypoidally displaced relationship of the first axis of rotation to the second axis of rotation and a rotary speed of the coated master gear in relation to the hypoidally displaced relationship such that a relative sliding velocity arising between the longitudinally curved teeth and the gear teeth has a value within the range of conventional or predetermined abrading surface speeds; continuously abrading in a single operation at least a selected set of the set of all the longitudinally concave tooth flanks and the set of all the longitudinally convex tooth flank while performing a predetermined feed motion of the coated master gear relative to the rough machined working rotary form tool blanks; and coating at least one tooth flank of the finish machined working rotary form tool with an abrading medium.

A variant embodiment of the still further method of the present invention, among other things, is manifested by the features that it comprises the steps of mounting the rough machined bevel gear blank in a first spindle of the apparatus; employing as the rotary form tool a rotary form tool having a second number of gear teeth and at least one abrading surface; mounting the rotary form tool in a second spindle of the apparatus; adjusting a selected one of the first spindle and the second spindle such that the rough machined bevel gear blank and the rotary form tool mesh such that the first axis of rotation and the second axis of rotation mutually define a hypoidally displaced relationship in which conjoint rotation of the first spindle and the second spindle produces relative sliding between tooth flanks of the rough machined bevel gear blank and the rotary form tool; selecting the hypoidally displaced relationship and a first speed of rotation for the second spindle such that the relative sliding has a velocity lying within the range of conventional or predetermined surface speeds for abrading operations; employing first rotary drive means to rotate the first spindle at the first speed of rotation; employing second rotary drive mans conjointly with regulation means to rotate the second spindle in synchronism with the first spindle at a second speed of rotation related to the first speed of rotation by the ratio of the first number of longitudinally curved teeth to the second number of gear teeth; effecting a relative feed motion between the first spindle and the second spindle; and coating at least one tooth flank of the finish machined working rotary tool with an abrading medium.

The yet further method of the present invention, among other things, is manifested by the features that it comprises the steps of: (a) setting-up the data programs for the associated rough-cut tools on the basis of a stored master gear data program for a hypoid gear transmission; (b) fabricating the rough cut tools in accordance with the set-up data programs; and (c) coating the fabricated tools with an abrading medium.

In other words, the yet further method of the present invention, among other things, is manifested by the features that it comprises the steps of: employing the first set of dimensional data for generating a second set of dimensional data relating to the configuration of a hypoid gear conjugate to the hypoid gear master; fabricating and finish machining the rotary form tool according to the second set of dimensional data; and coating at least one tooth flank of the finish machined rotary form tool with an abrading medium.

The advantages attained by the present invention consist in that the method can be employed independently of the longidutinal form of the bevel gear teeth and independently of the longitudinal tooth profiles, e.g. circular arcs, cyloids or involutes, independently of the presence or absence of crowning as well as of straight or generated tooth flank profiles. The method is employed as a continuous grinding process and therefore favorably influences the economy as well as the quality of bevel gear transmissions in that the effects of hardening distortion as well as pitch errors, axial run-out errors and radial run-out errors are substantially eliminated and therefore the pairwise identification or matching of pinion and crown gear as well as their joint storage become redundant. Thus, for the first time, accurate mass-produced copies of master gears of a master gear set are possible. A further advantage consists in that the grinding method can also be employed independently of the fabrication of the rough cut bevel gear, whether by forging, rolling, casting, et cetera.

A further advantageous embodiment of the tool consists in that its tooth flanks are coated with a thin layer of abrading material, such as cubic boron nitride, for instance Borazon.

BRIEF DESCRIPTION OF THE DRAWINGS

The invention will be better undeerstood and objects other than those set forth above will become apparent when consideration is given to the following detailed description thereof. such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof only enough of the structure of the inventive tool and apparatus has been illustrated therein as is needed to enable one skilled in the art to readily understand the underlying principles and concepts of this invention. The subsequently described embodiments illustrated in FIGS. 1 through 10 relate to rough machined bevel gears to a bevel gear set or bevel gear pair fabricated with a rotating cutter head in a continuous cutting process. At least, for instance, a longitudinal crowning of the teeth is produced by skewing the cutter head axis. In principle such rough machined bevel gears can also be fabricated by other known manufacturing procedures, possibly resulting in different longitudinal forms of tooth, e.g. circularly arcuate, cycloidal or involute, i.e. the inventive method of finish machining can be performed independently of the longidutinal form of tooth and independently of the fabrication of the rough machined blanks for the bevel gears. Merely a different dimensioning of the tool must be employed in that, according to the selected form of tooth, the principal dimensional data for the tool must be conventionally worked out, but worked out for a tool designed as a component of a gear transmission with displaced axes, i.e. a hypoid gear transmission.

Figure 1:
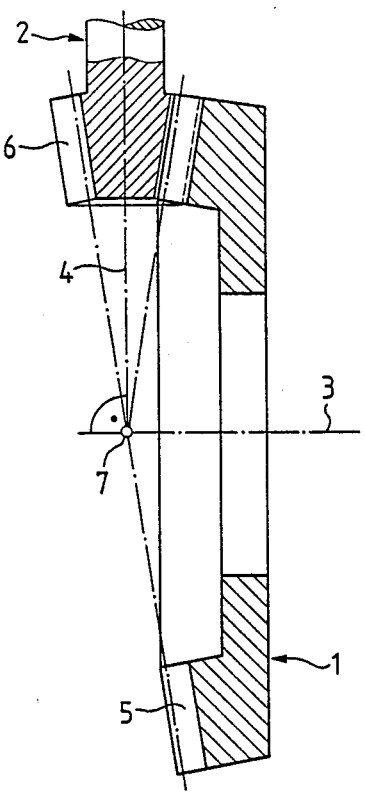
FIG. 1 shows a cross-section through a pair of bevel gears with intersecting axes.

Turning now specifically to FIG. 1 of the drawings, it will be seen that a conventional bevel gear pair, also known as bevel gear set or bevel gear transmission, comprises a ring gear or crown gear 1, the larger gear of the pair (usually the driven gear), and a pinion gear 2, the smaller gear of the pair (usually the driving gear), arranged with non-displaced axes, i.e. with their axes of rotation intersecting at a mutual apex 7 of their respective pitch cones. A crown gear axis 3 and a pinion gear axis 4 extend, for instance, mutually perpendicular and intersect at the mutual apex 7 of the pitch cones of the bevel gear pair. A toothing 5 of the crown gear 1 may be, for instance, produced solely by plunge cutting, while a toothing 6 of the pinion gear 2 may be produced by gear generation, i.e. the teeth of the toothing 5 normally exhibit straight tooth flanks while those of the toothing 6 exhibit curved tooth flanks which, although not readily apparent from FIG. 1, is well-known in the art. For the installation of such a bevel gear set or bevel gear pair comprising a randomly chosen crown gear 1 and a randomly chosen pinion gear 2, both of the bevel gears 1 and 2 are rough machined in known manner in mass production with a grinding allowance and subsequently ground.

Figure 2:
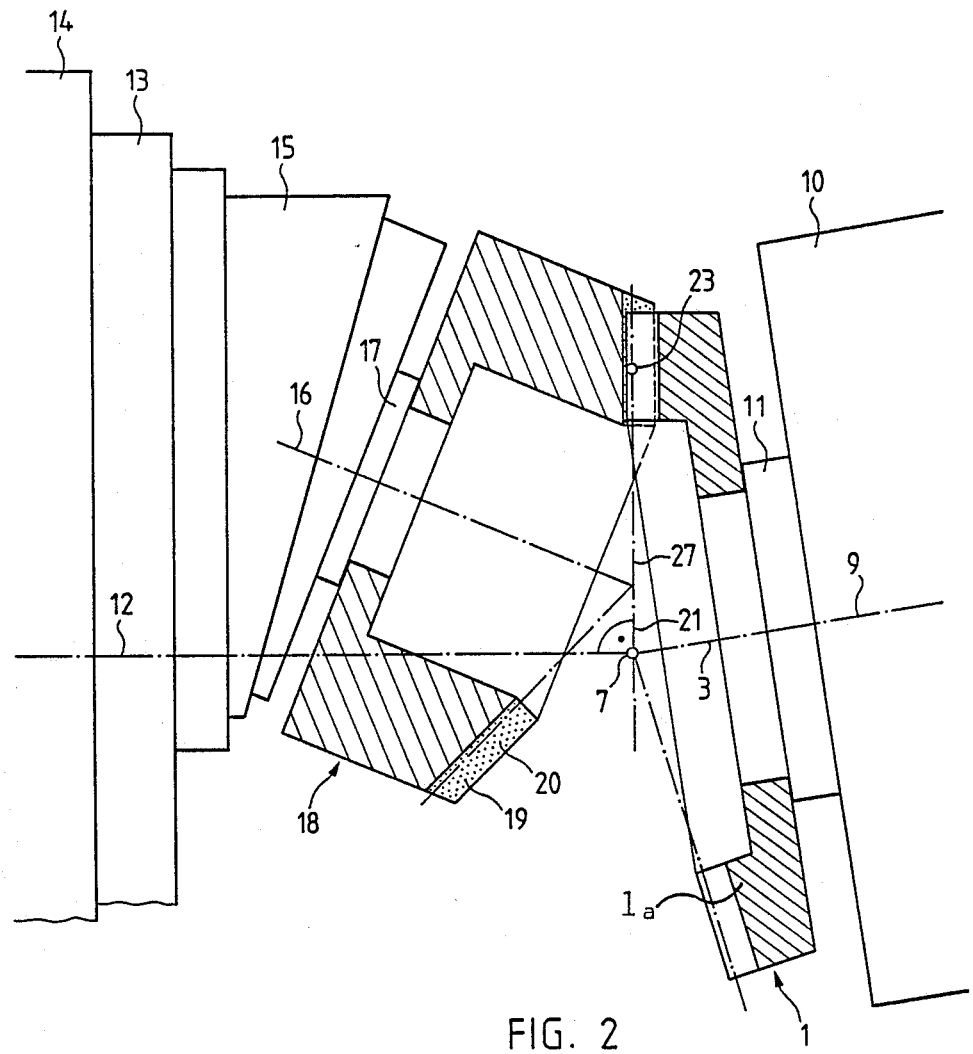
FIG. 2 shows an arrangement for grinding the crown gear of a bevel gear pair according to FIG. 1.

In FIG. 2, the rough machined crown gear 1 is mounted on a spindle 11 of a headstock 10 and rotatable about an axis of rotation 9 as a workpiece 1a to be ground. The crown gear axis 3 coincides with the axis of rotation 9 of the spindle 11. The apex 7 of the pitch cone of the crown gear 1 lies on an axis 12 about which a generating drum 13 in a generating or roll cradle 14 is rotatbly journalled. A pivoting component 15 connected to the generating drum 13 comprises a spindle 17 on which a tool or grinding cutter 18 having a tool axis 16 is fastened. The tool 18 is a rotary form tool which is helically conically formed and comprises an abrading surface 19 on its tooth flanks 20. The tool 18 is furthermore designed with an axially displaced relationship to the workpiece 1a, i.e. the axes of rotation of the tool 18 and of the workpiece 1a do not intersect, and is designed to form conjointly therewith a bevel gear pair. The tool 18 is arranged such that an upper line or generatrix 21 of a pitch cone 27 of the workpiece 1a extends as nearly perpendicular as possible to the axis 12 in the machining region. For the sake of simplicity, the workpiece 1a and the tool 18 are shown in FIG. 3 in composite section taken along the lines I—I for the workpiece 1a and II—II for the tool 18.

Figure 3:
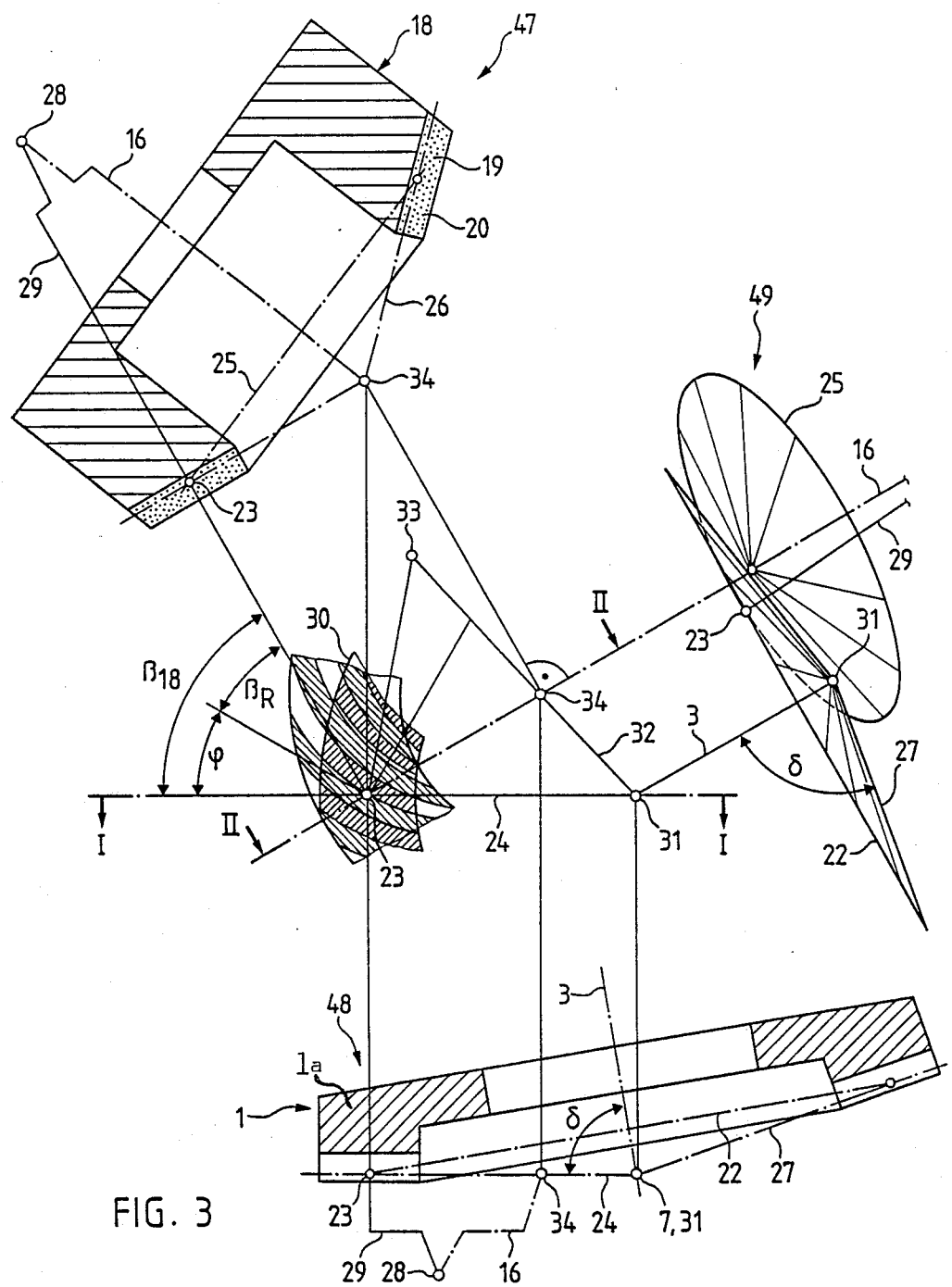
FIG. 3 schematically shows the axial displacement geometry of the crown gear and the tool.

FIG. 3 illustrates the axially displaced geometry of the tool 18 relative to the workpiece 1a on the basis of a planar conjugate gear geometry well-known in the art and also in connection with mating relationships of the graphic developments of the pitch surface of a planar conjugate gear 30 associated with the crown gear 1 and the tool 18. FIG. 3 also shows the workpiece 1a and the tool 18 in section and their respective pitch cones 27 and 26 in three projected views 47, 48 and 49. The mating relationship and a section 40 through a tooth of the tool 18 are supplementarily illustrated on an enlarged scale in FIG. 4. A common reference point 23 is situated on a common longitudinal tooth flank line 38 of the tool 18 and the planar conjugate gear 30. A planar conjugate gear center point 31 is connected with a cutting tool center point 33 by a straight line 32. A pitch cone apex 34 of the tool 18 is situated on this straight line 32. A center of curvature 35 is situated on a line 36 normal to a line 37 tangent to the common longitudinal tooth flank line 38 and at the reference point 23. A helix angle $\beta_R$ and a helix angle $\beta_{18}$ of the planar conjugate gear 30 or the workpiece 1a and of the tool 18, respectively, are each defined by the tangent line 37. An axis displacement angle $\phi$ is determined by the difference between the helix angle $\beta_{18}$ and $\oplus_R$ and may be, for instance, 20°. As can be seen, there is good mating or matching between both graphic developments of the pitch surfaces of the planar conjugate gear 30 and of the tool 18.

The crown gear 1 is shown in section in the projected view 48 projected from a central conjugate radius 24 in FIG. 3. It will be seen that the conjugate gear center point 31 and the pitch cone center point 7 of the crown gear 1 as well as the conjugate radius 24 and a line or generatrix of the pitch cone 27 all coincide. In turn, a projection of the pitch cone center point 34 is situated on this line. The position of the crown gear axis 3 is thus determined. The position of the tool axis 16 is determined by the pitch cone center point 34 and an intersection point 28 with a line or cathetus 29, as will be most readily appreciated from the projected view 47. This location of the two axes 3 and 16 and thus of the workpiece 1a and the tool 18 corresponds to that shown in FIG. 2.

The projected view 47 makes clear the graphical determination of the pitch cone 26 and of a pitch circle 25 of the tool 18 which is designed as a hypothetical gear conjugate to the crown gear 1, preferably with a skew angle hypoid geometry and with an abrading surface 19 on the tooth flanks 20 of the helically conical toothing according to this illustrative embodiment.

The position of both the pitch cones 26 and 27 relative to one another can be most readily seen from the projected view 49. The reference point 23 is situated both upon a pitch circle 22 of the crown gear 1 as well as on the pitch circle 25 of the tool 18. The tool axis 16 and the line or cathetus 29 are mere projections. The pitch cone 27, the pitch circle 22 and an angle $\delta$ are equivalent to those shown in the projected view 48.

The hypoid geometry, in this illustrative embodiment a skew angle hypoid geometry, of the tool 18 relative to the workpiece 1a is especially well illustrated by the position of the crown gear axis 3 and the tool axis 16 in the views of FIG. 3.

Figure 5:
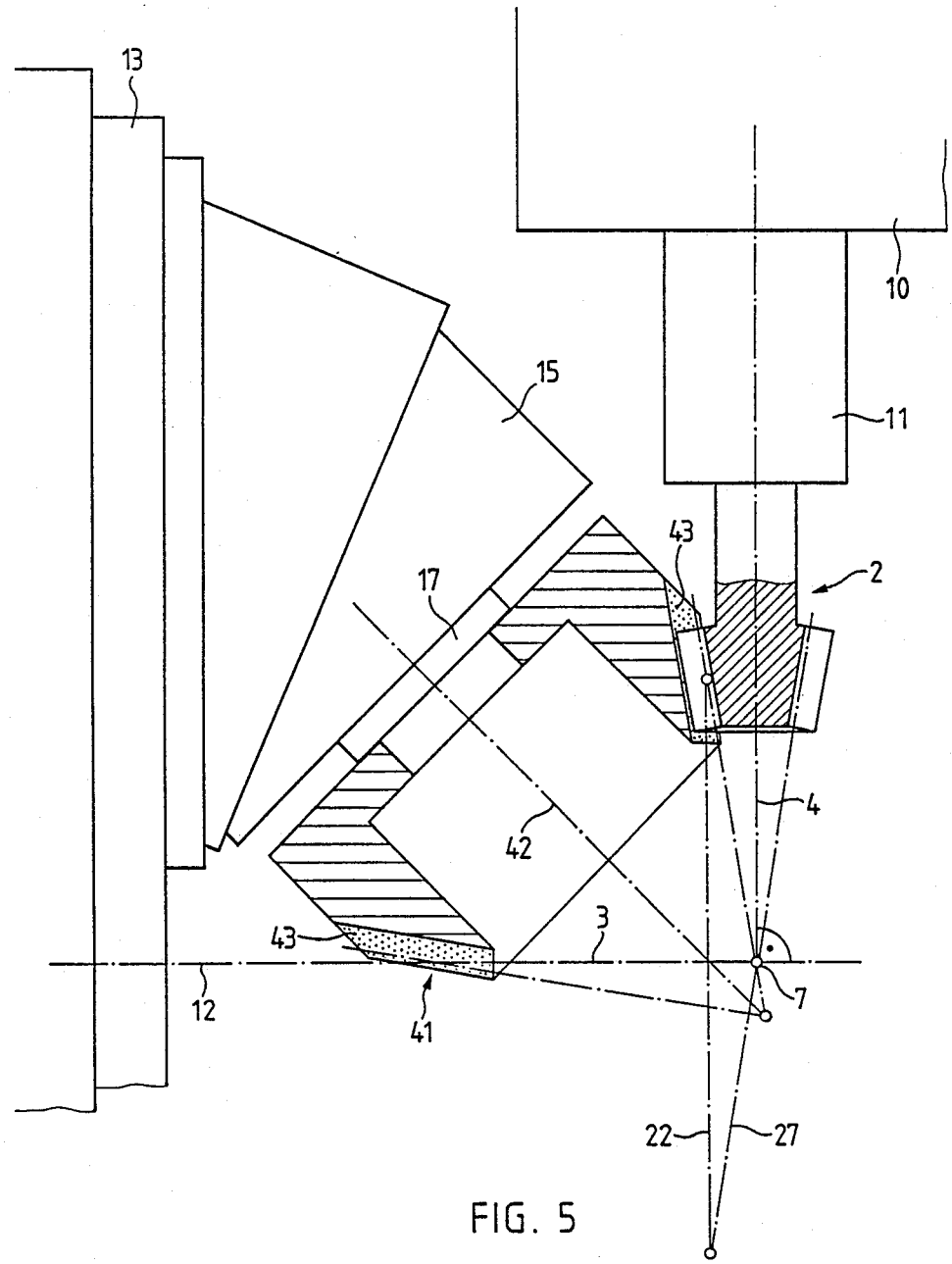
FIG. 5 shows an arrangement for grinding the pinion gear of the gear set according to FIG. 1.

According to FIG. 5, it is now the rough machined pinion gear 2 which is mounted on the rotatable spindle 11 of the headstock 10 as a workpiece 2a to be ground. The apex 7 of the pitch cone of the pinion gear 2 is situated on the axis 12 of the generating drum 13. A further tool 41 having a further tool axis 42 is fastened to the spindle 17 of the pivoting component 15 and is also helically conical and provided with abrading tooth flanks 43 and is designed and arranged in FIG. 5 such that it also forms conjointly with the finish ground pinion gear 2 a preferably skew angle hypoid gear transmission. The pinion gear axis 4 of the workpiece 2a extends in this illustrative embodiment substantially perpendicular to the axis 12, that is to the crown gear axis 3 of the hypotheticcal associated crown gear 1 which is arranged on the axis 12 of the generating drum 13 as a generating conjugate gear and which is represented by the pitch cone 27 and the pitch circle 22.

Figure 6:
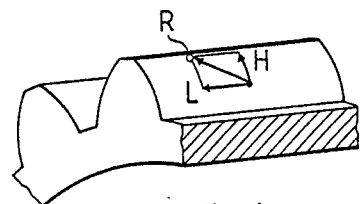
FIG. 6 shows a perspective view of gear teeth for explaining the grinding direction and relative sliding velocities.

In FIG. 6, a tooth sliding diagram, which is equivalent to a grinding direction diagram, is represented upon a segment of toothing of a workpiece 1a or 2a. Due to the axial displacement, i.e. the displacement of the tool axis 16 or 42 relative to the workpiece axis 3 or 4, respectively, when the gears are in mesh a longitudinal relative sliding L between tooth flanks results along the tooth flanks in addition to the radial tooth sliding H. The magnitude and direction of a resultant vector representing the sliding R can be determined from the diagram. These values of magnitude and direction vary over the width of the tooth and over the height of the tooth.

Figure 4:
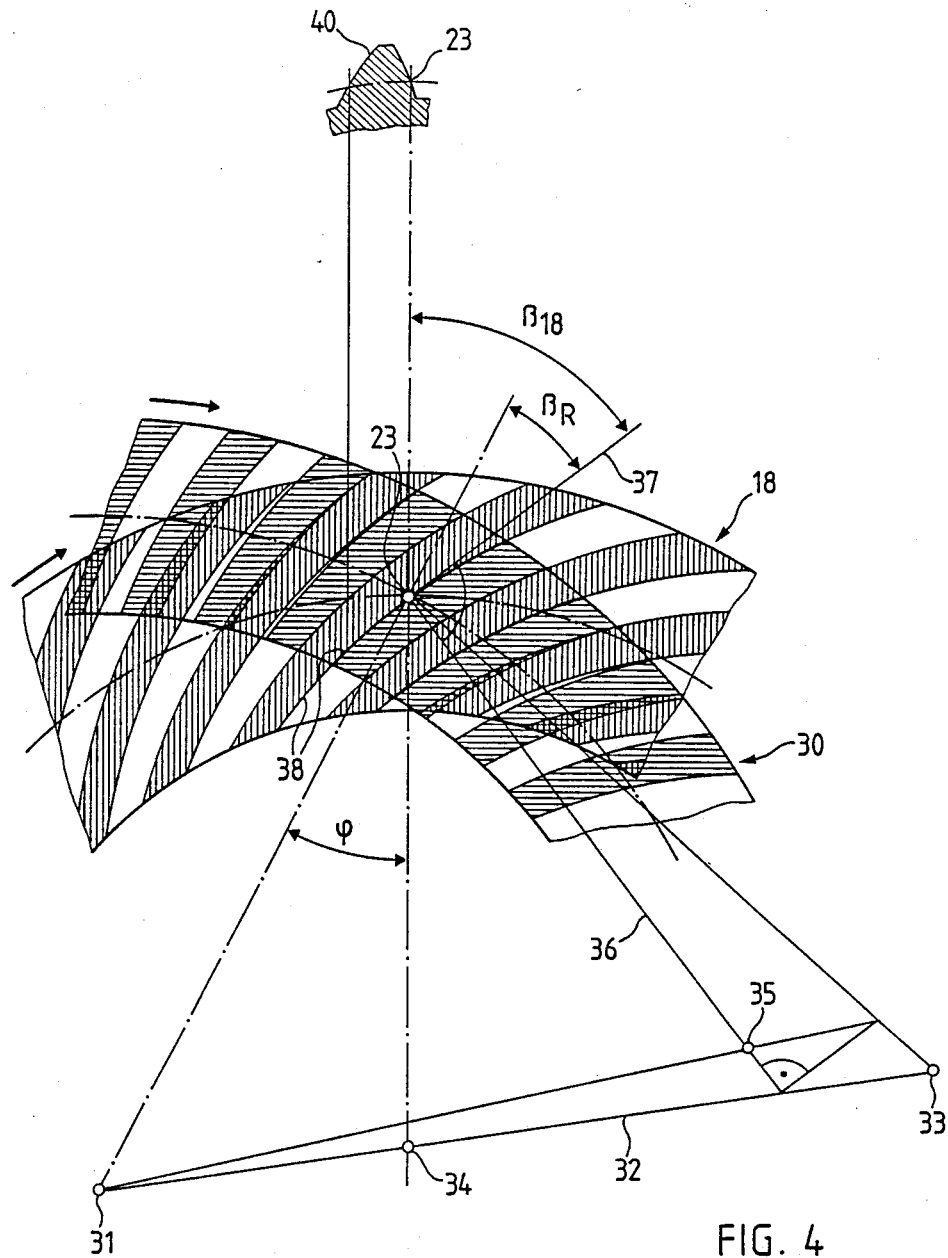
FIG. 4 schematically shows the mating relationships of developments of a planar conjugate gear and the tool of FIG. 3 on an enlarged scale.
Figure 7:
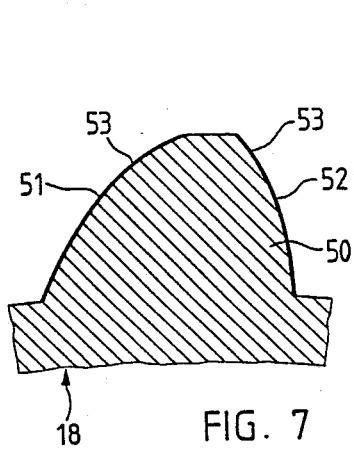
FIG. 7 shows a cross-section through a tool tooth on an enlarged scale.

In FIG. 7, a tool tooth 50 is shown in section, corresponding to the section 40 of FIG. 4, i.e. associated with the tool 18. Both tool flanks 51 and 52 comprise a surface of abrading material 53, e.g. a coating or lamination 0.1 mm. thick of diamond powder or of Borazon, which is excellently well suited as a grinding medium coating. The tooth top lands and tooth bottom lands can optionally also be coated.

Figure 9:
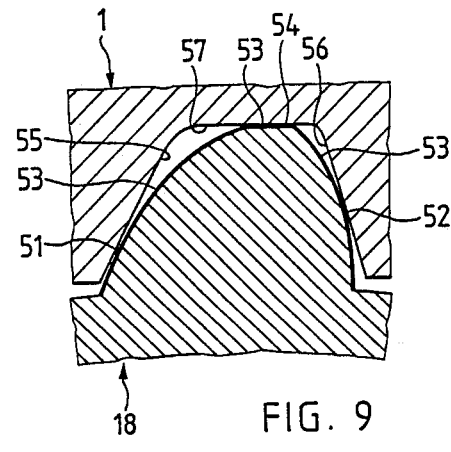
FIG. 9 shows a segment of toothing during grinding according to a second inventive method on an enlarged scale.
Figure 8A:
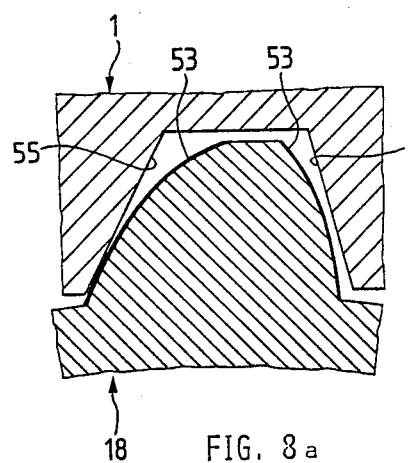
FIGS. 8a and 8b each show a segment of gear toothing during grinding according to a first inventive method on an enlarged scale.
Figure 8B:
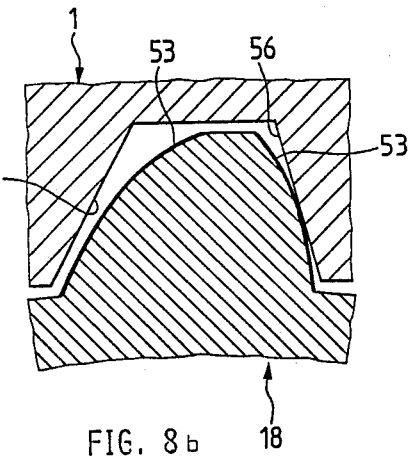

Segments of the toothing of the workpiece 1a and the tool 18 are shown in FIGS. 8a, 8b and 9. According to FIG. 8a, for instance, all concave tooth flanks 55 are ground in a first machining operation and, according to FIG. 8b, all convex tooth flanks 56 of the toothing of the workpiece 1a are ground in a second machining operation, for instance in that the tooth thickness of the tool 18 is designed less than the width of the corresponding tooth gap of the workpiece 1a. There is then an air gap between the tooth flanks not currently being ground. Preferably, however, both the concave tooth flanks 55 and the convex tooth flanks 56 are continuously ground in a single operation by the tooth flanks 51 and 52 of the tool 18 provided with the abrading material 53 according to FIG. 9. Furthermore, tooth top lands 54 of the toothing can also supplementarily be provided with abrading material 53, so that in particular the root or base fillet radii can also be conjointly ground.

Figure 10:
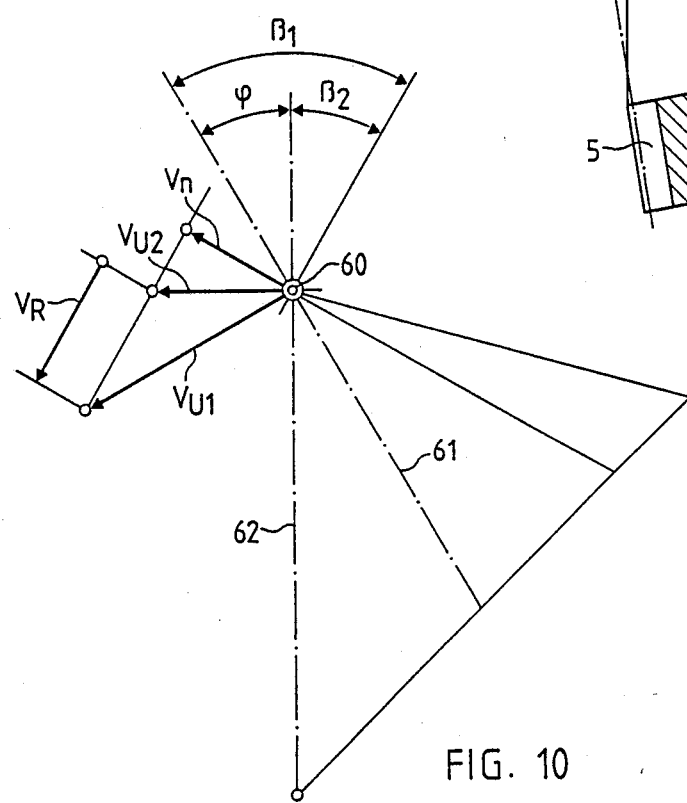
FIG. 10 schematically shows a diagram for determining the surface speed of grinding.

A resultant velocity $V_R$, in this illustrative embodiment the surface speed for grinding, is graphically determined in FIG. 10 on the basis of planar conjugate gear geometry well-known in the art and of the following values:

Reference point 60, tool axis 61, mean conjugate radius 62, tool helix angle $\beta_1$, workpiece helix angle $\beta_2$, tool peripheral speed $V_{U1}$, workpiece peripheral speed $V_{U2}$ and normal velocity $V_n$.

The method according to FIGS. 1 through 10 functions as follows:

As is well known, bevel gear sets or bevel gear pairs with or without axial displacement may be fabricated, for example, according to one of two well known bases of generation, i.e. the planar conjugate gear method or the generating mating gear method. Hypoid gear transmissions fabricated according to planar conjugate gear geometry become increasingly inaccurate as the relative displacement of the axes becomes greater. Correct prerequisites for hypoid gear transmission, however, prevail again if the one gear is machined by plunge cutting only and the other gear according to generating mating gear geometry. In addition to the tooth height sliding, longitudinal tooth sliding along the tooth flanks according to FIG. 6 results, for instance, from the displacement of axes, for instance of a pinion axis relative to a crown gear axis. The magnitude and direction of the resultant R as a resultant sliding velocity is thus capable of being influenced by the angle of axis displacement. This relative sliding velocity R is exploited according to the invention as a surface speed $V_R$ for finish grinding. A requisite crown gear speed of rotation $n_2$ for a given grinding surface speed $V_R$ will be determined on the basis of the following calculation example in connection with FIG. 10. Given the following data:

nominal surface speed for grinding: $V_R = 15$ m/s
average crown gear diameter: $d_2 = 150$ mm
helix angle of crown gear: $\beta_2 = 25°$
helix angle of tool: $\beta_1 = 60°$ Then the crown gear speed of rotation $n_2$ is established and calculatively determined according to the following well-known formulae:

$$V_{U2} = \frac{d_2 \cdot \pi \cdot n_2}{60 \cdot 1000}$$

$$V_n = V_{U2} \cdot \cos\beta_2$$

$$V_R = V_n(\tan\beta_1 - \tan\beta_2)$$

$$V_R = \frac{d_2 \cdot \pi \cdot n_2 \cdot \cos\beta_2(\tan\beta_1 - \tan\beta_2)}{60 \cdot 1000}$$

$$n_2 = \frac{V_R \cdot 60 \cdot 1000}{d_2 \cdot \pi \cdot \cos\beta_2(\tan\beta_1 - \tan\beta_2)}$$

$$n_2 = \frac{15 \cdot 19{,}098.593}{150 \cdot 0.9063 \cdot (1.7321 - 0.4463)} = 1{,}665 \text{ RPM}$$

This means that each tooth is ground approximately 28 times per second. If a magnitude of material removal of 0.001 mm is employed, then a flank grinding rate of 0.028 mm per second results on all teeth. With a grinding allowance of approximately 0.2 mm a crown gear can therefore be ground after hardening in less than one minute according to this example. The prerequisites for economical grinding are thus fulfilled.

For grinding the crown gear 1 according to FIG. 2 it is thus necessary to design the grinding gear or rotary form tool as a conjugate gear such that both conjointly form a hypoid gear transmission. The crown gear 1 and the tool 18 mesh in the ratio of their tooth numbers. The requisite rotational speed of the crown gear 1 is determined according to the above example. The workpiece 1a and the tool 18 may be, for instance, driven in synchronism by two drive motors which are interconnected by a so-called "electric shaft", i.e. the spindles 11 and 17 are constrained to rotate at predetermined rotary speeds in mutual synchronism.

The inventive apparatus will be described in more detail in relation to the FIGS. 11 through 19. For grinding the toothing of the workpiece 1a, the feed motion of the tool 18 is effected in the direction of the axis 12 of the generating or roll cradle 14, i.e. substantially perpendicular to the reference point 23. Both tooth flanks of the teeth are preferably continuously ground in a single grinding operation, since the workpiece 1a and the tool 18 are in mesh.

Since in this case not generating motion is performed, the grinding procedure can also be performed on a machine devoid of a generating mechanism. As can be seen from FIG. 4, uncrowned longitudinal tooth flanks are produced on the workpiece 1a in relation to the corresponding tooth flanks of the tool 18. The normally desired relative crowning between the pinion gear 2 and the crown gear 1 must therefore be correspondingly provided when fabricating the tools 18 and 41. It is furthermore also possible to provide that the rough machined toothing be designed such that not the entire tooth flank surface, but only a magnified contact pressure region be ground. As can be seen from FIG. 9, the tooth cross-section of the tool 18 does not correspond to the tooth gap form of the workpiece 1a, since between the workpiece 1a and the tool 18 not only longitudinal motions but also height motions ensuing from machine engagement corresponding to FIG. 6 are performed.

The direction of rotation is selectively determined, preferably however in the direction indicated in FIG. 4, in order that the tool 18 penetrate the workpiece 1a from the interior towards the exterior. This continuous grinding process not only eliminates the hardening distortion, but also axial run-out errors and radial run-out errors. In particular, pitch deviations can also be eliminated in that each tooth of the tool 18 runs through each tooth gap of the workpiece 1a in an equalizing manner.

Grinding with an integral generating motion is represented in FIG. 5. The procedure is analogous to that of grinding the crown gear 1 according to FIG. 2 except that a generating motion is now performed in known manner about the generating axis 12 either as a supplementary or as an exclusive feed motion. By correspondingly designing the tooth profile on the tool, however, the necessity of performing a generating feed motion during grinding of generated bevel gears can be circumvented.

A rotary form tool for performing the inventive method is preferably designed such that, in addition to its hypoidal geometry, each engagement surface of a tooth of the tool forms the negative of a tooth gap of the finish ground workpiece in the ground region during grinding. Not necessarily but advantageously, the tool will comprise a skew angled displacement of its axis relative to the axis of the workpiece and will normally differ from the axial relations of the bevel gear transmission to be machined. It will furthermore comprise at least on one of its tooth flanks, either on a convex tooth flank or on a concave tooth flank, a coating of grinding or abrading medium which can be renewed at will. Preferably, however, all tooth flanks are thus coated and the tool exhibits a greater tooth length than the workpiece.

A tool may be, for instance, fabricated as follows:
a master gear of a bevel gear or hypoid gear transmission is coated on its tooth flanks with a grinding medium;

according to one method of the invention, a rough machined tool is ground as a workpiece by the coated master gear as a tool; and subsequently the rough machined and finish ground tool now constituting a so-called "master negative gear" is in turn coated with a grinding medium.

The master gear is preferably supplementarily coated with abrading material in its bottom land regions in order that the top land regions of the tool may be designed for grinding the base fillet radii, cf. e.g. the crown gear 1 in FIG. 9 with a tooth gap bottom land region 57 and the tool 18 with the tooth top land 54.

On the other hand, corresponding data programs can, for instance, be generated from a stored master gear set data program and therewith associated machine setting data can be established for the tools and, if necessary, corrected until the generated bevel gears produce exact replications of the master gears.

Figure 11:
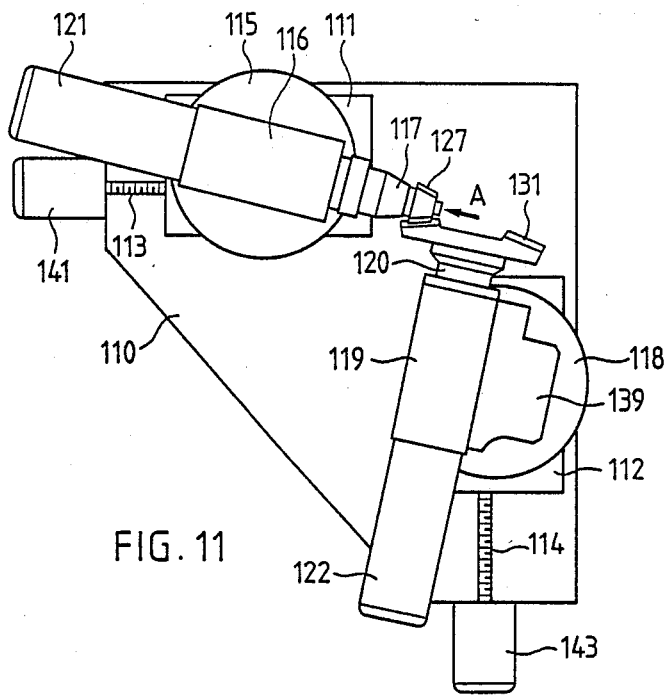
FIG. 11 shows a plan view of the inventive apparatus arranged for grinding large pinion gears for heavy vehicles.
Figure 12:
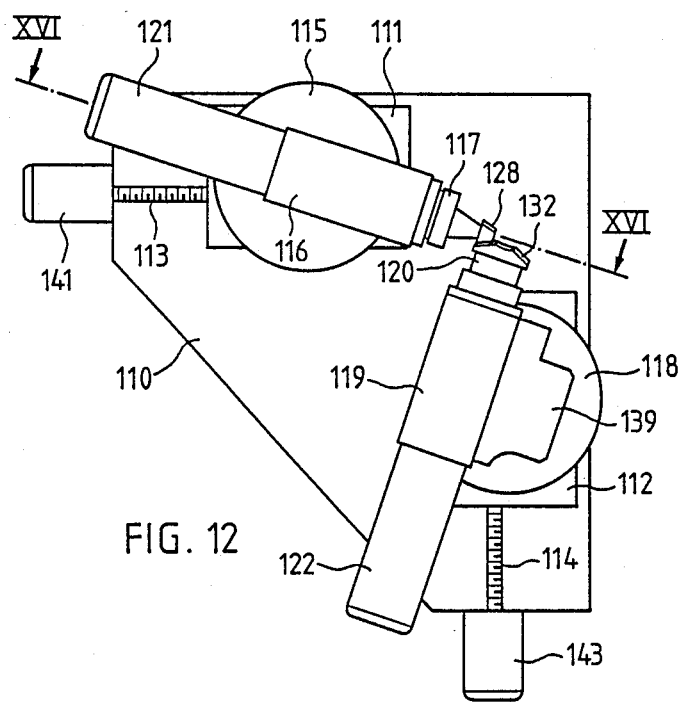
FIG. 12 shows a plan view analogous to FIG. 11 of the inventive apparatus arranged for grinding small pinion gears for automobiles.

Turning now specifically to FIG. 11 of the drawings, the apparatus illustrated therein by way of example and not limitation and employed to realize the method as hereinbefore will be seen to comprise a machine bed 110. A first slide or carriage 111 translatable in the horizontal direction in the drawing and a second carriage or slide 112 vertically translatable in the drawing are situated on this machine bed 110. A first spindle 113 driven by an electric motor 141 serves for translating the first slide 111 and a second spindle 114 also driven by an electric motor 143 serves for translating the second slide 112. A rotary table 115 with a housing 116 for journalling a first spindle 117 is fastened to the first slide 111 and a rotary table 118 with a turret 139 (cf. FIGS. 14 and 18) is fastened to the second slide. A housing 119 for journalling a spindle 120 is translatably guided on the turret 139. The spindle 117 is driven by a first electric motor 121 and the spindle 120 is driven by a second electric motor 122. The workpiece 127 through 130 (see FIGS. 11 to 14) to be ground is fastened to the spindle 117 and a tool 131 and 134 is fastened to the spindle 120 in a manner analogous to the previously described tools 18 and 41.

Figure 14:
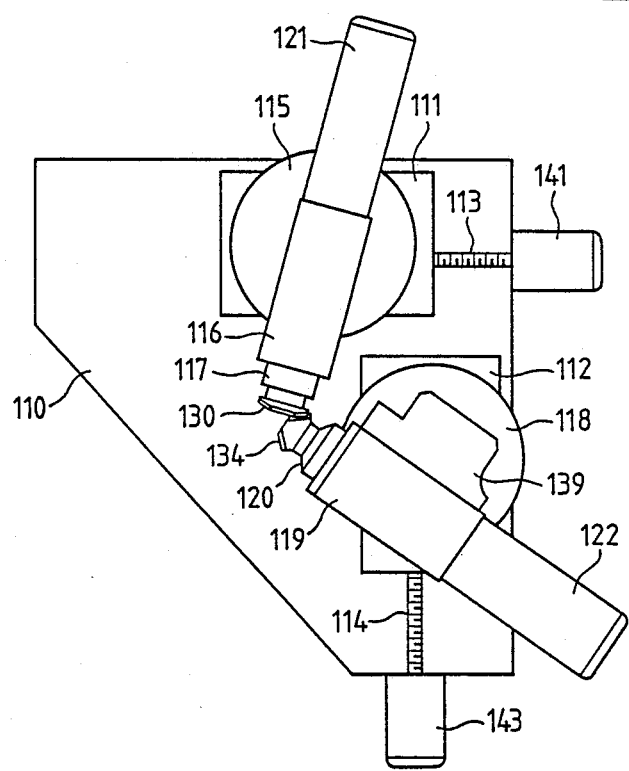
FIG. 14 shows a plan view analogous to that of FIG. 11 of the inventive apparatus arranged for grinding small crown gears for automobiles.
Figure 15:
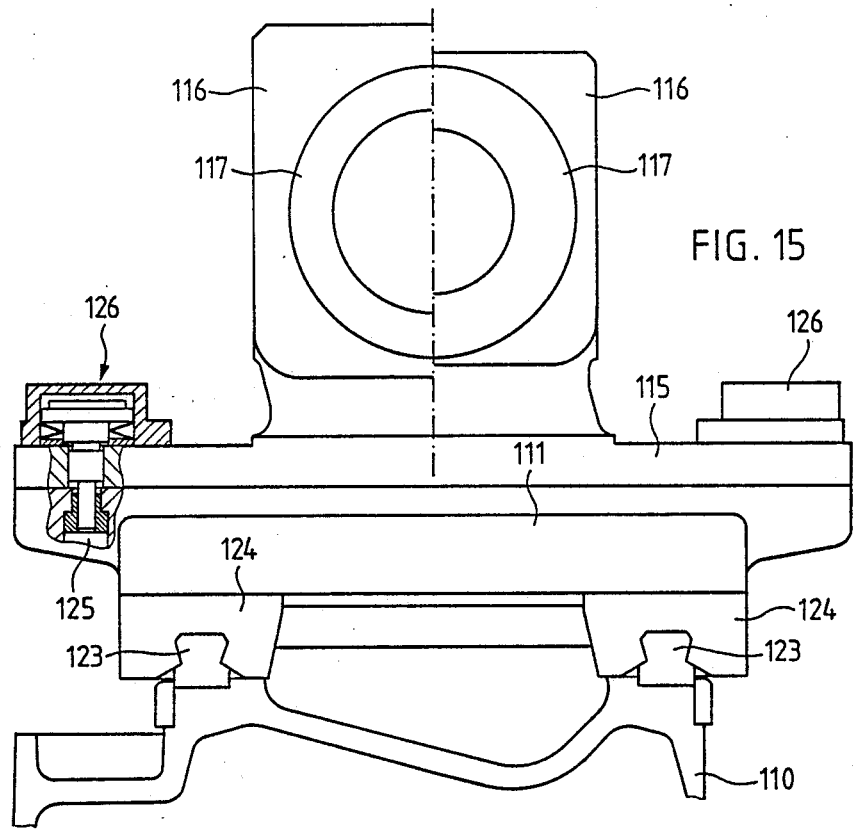
FIG. 15 shows a partial elevation of the inventive apparatus in the direction of the arrow A in FIG. 11.

Two rails or guideways 123 upon which the slide 111 is translatably journalled by means of guide members 124 are fastened to the machine bed 110 according to FIG. 15. The rotary table 115 is rotatably journalled on this slide 111. Only an annular slot 125 of this journalling and two of in total six clamping cups 126 with which the rotary table 115 can be clamped in any desired position on the annular slot 125 of the slide 111 are visible in FIG. 15. The spindle housing 116 in which the spindle 117 is journalled is fastened on the rotary table 115. The left half of the drawing shows a spindle 117 of increased diameter for large workpieces 127 and 129 (cf. FIGS. 11 and 13) and the right half of the drawing shows a spindle 117 of lesser diameter for small workpieces 128 and 130 (cf. FIGS. 12 and 14).

Figure 16:
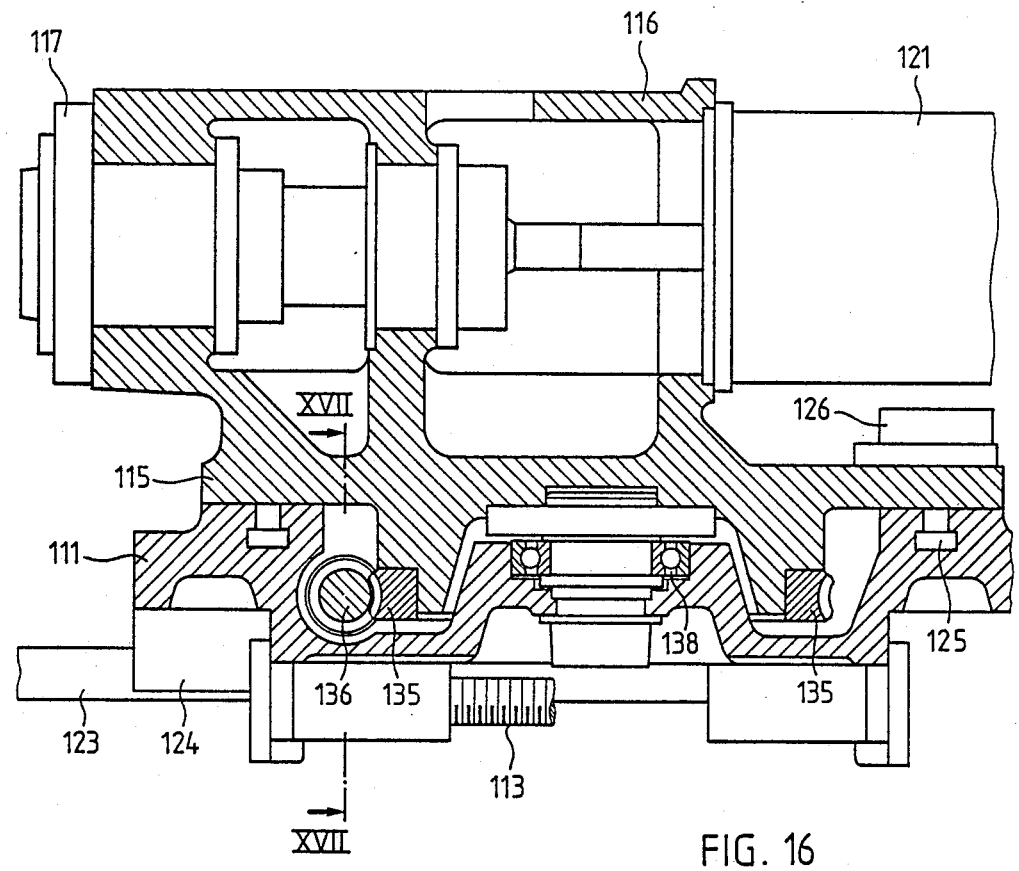
FIG. 16 shows a vertical cross-section taken along the line XVI—XVI in FIG. 12.
Figure 17:
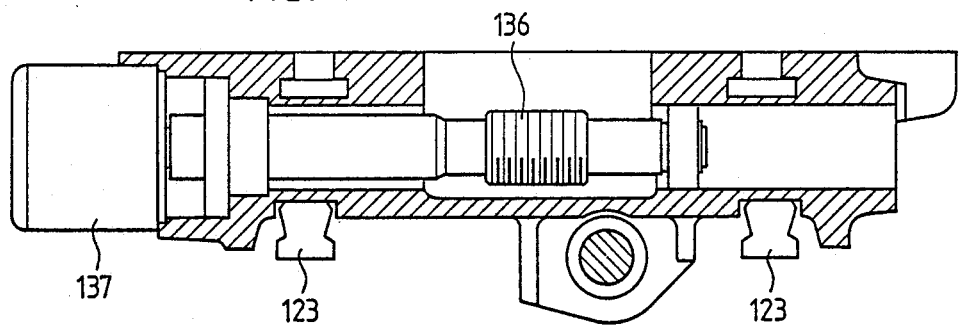
FIG. 17 shows a cross-section taken along the line XVII—XVII in FIG. 16.

The slide 111 is translatably guided on rails or guideways 123 of the machine bed 110 not particularly shown in FIG. 16 by means of the guide members 124 and with the aid of the spindle 113. The rotary table 115 is rotatably journalled on the slide 111. A worm wheel or worm gear 135 which meshes with a worm 136 is fastened to the underside of the rotary table 115. In order to rotate the rotary table 115 on the slide 111, the worm gear 135 is driven by an electric motor 137 (cf. FIG. 17) through the worm 136. In order that the rotary table 115 be easily rotatable upon the slide 111, a ball bearing 138 is provided in the middle of the rotary table 115.

For clamping the rotary table 115 in the desired position on the slide 111, the annular slot 125 is situated in the slide 111 and a number of, for instance six, clamping cups 126 are arranged on the rotary table 115 with the aid of which the rotary table 115 can be clamped to the annular slot 125 of the slide 111. The spindle 117 is journalled in the usual manner in the spindle housing 116.

Figure 18:
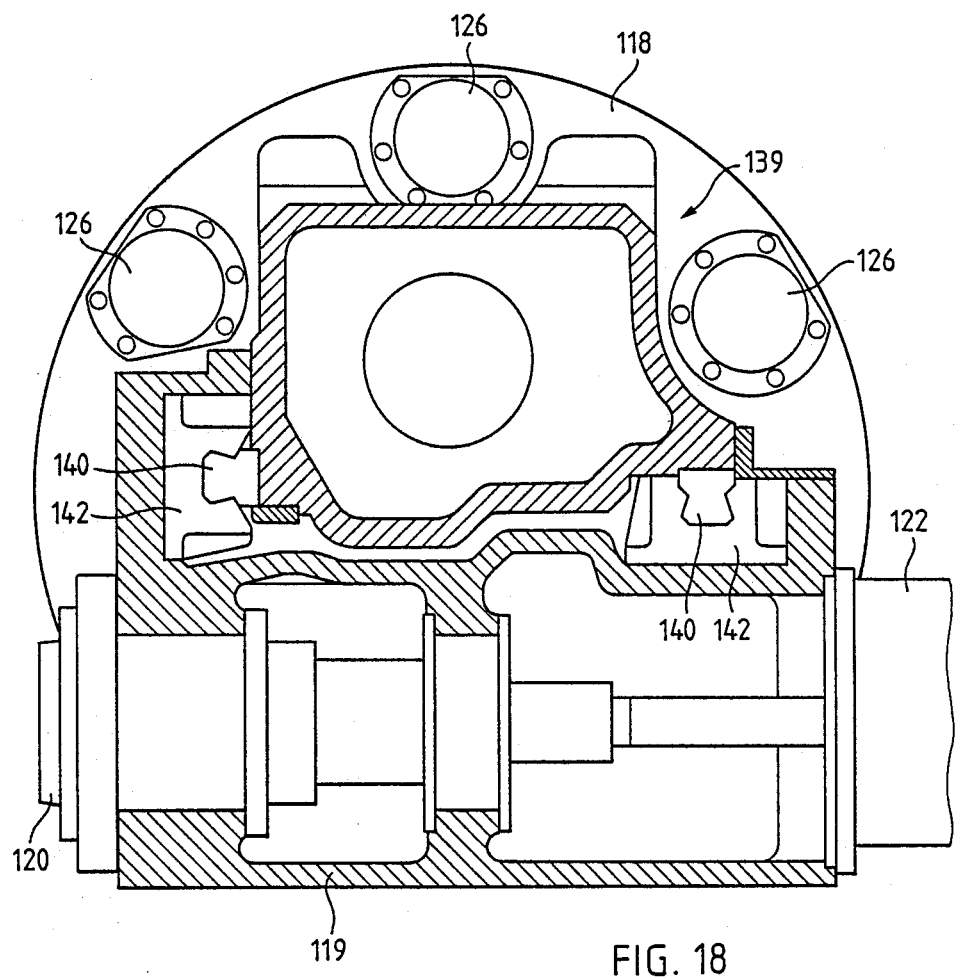
FIG. 18 shows a horizontal cross-section taken at the height of the tool spindle in FIG. 11.

A turret 139 is fastened to the rotary table 118 according to FIG. 18. This turret 139 comprises two vertical rails or guideways 140 upon which the housing 119 is translatably journalled with the aid of guide members 142. The spindle 120 is rotatably journalled in the housing 119 in the usual manner. The housing 119 of the spindle 120 on the rotary table 118 is thus vertically translatably journalled on a turret 139 in contradistinction to the housing 116 of the spindle 117 which is fixedly mounted on the rotary table 115.

Figure 19:
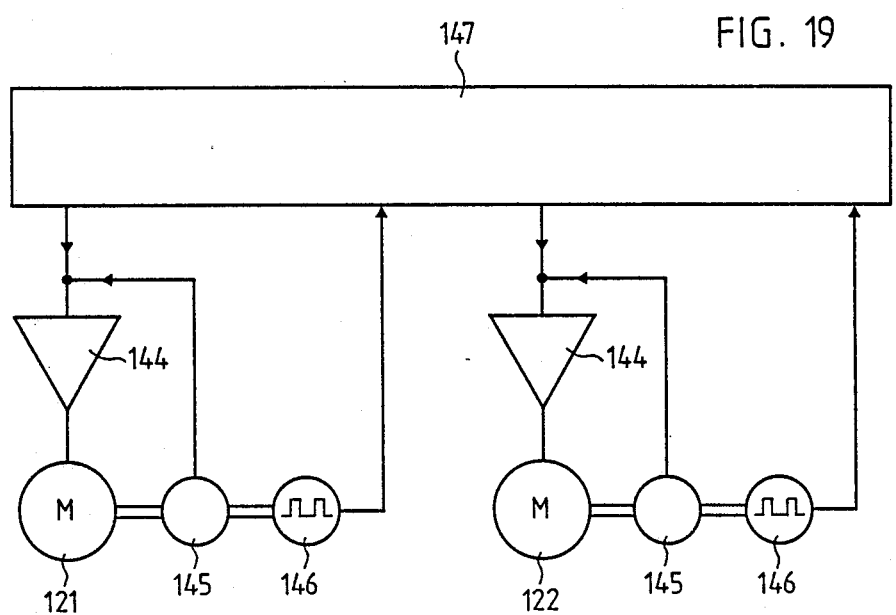
FIG. 19 schematically shows a circuit diagram of a so-called "electric shaft".

Both electric motors 121 and 122 are interconnected by a so-called "electric shaft" known per se and also known as an electronic transmission according to FIG. 19. This so-called "electric shaft" is necessary since it is not possible to connect the tool and the workpiece with one another through a mechanical transmission since the requisite speed of rotation for grinding the workpiece is much too high and cannot be transmitted by a gear transmission or the like from tool to workpiece. At high speeds of rotation the wear of such a mechanical transmission would be excessive.

This so-called "electric shaft" comprises, according to FIG. 19, a rotary speed regulator 144, a tacho-generator 145 and a pulse transducer 146 for each electric motor 121 and 122. Both electric motors 121 and 122 are driven in mutual synchronism at the desired speed of rotation by an electronic control 147. Since tool and workpiece are designed as gears, the speeds of rotation of both electric motors 121 and 122 must be proportional to the numbers of teeth of these gears. The electronic control 147 is constructed in known manner and comprises an operating console with a visual display unit and function buttons, a NC-system, an electronic transmission, a module with inputs and outputs to the grinding machine, et cetera.

One motor of the electric motors 121 and 122 is designed as a master motor and the other motor as a slave or servo motor.

The master motor should rotate faster than the slave motor, since the so-called "electric shaft" operates more precisely when the master motor rotates faster than the slave motor. The master motor should, however, preferably drive the tool and not the workpiece. Should it be required to grind the crown gear 1, then both conditions can be fulfilled, since then the pinion gear 2 serving as the tool 18 rotates more rapidly. However, should it be required to grind the pinion gear 2, then only one of the two conditions can be fulfilled. Preferably the more rapidly rotating workpiece 1a or 2a, namely the pinion gear 2, will be driven by the master motor.

Figure 13:
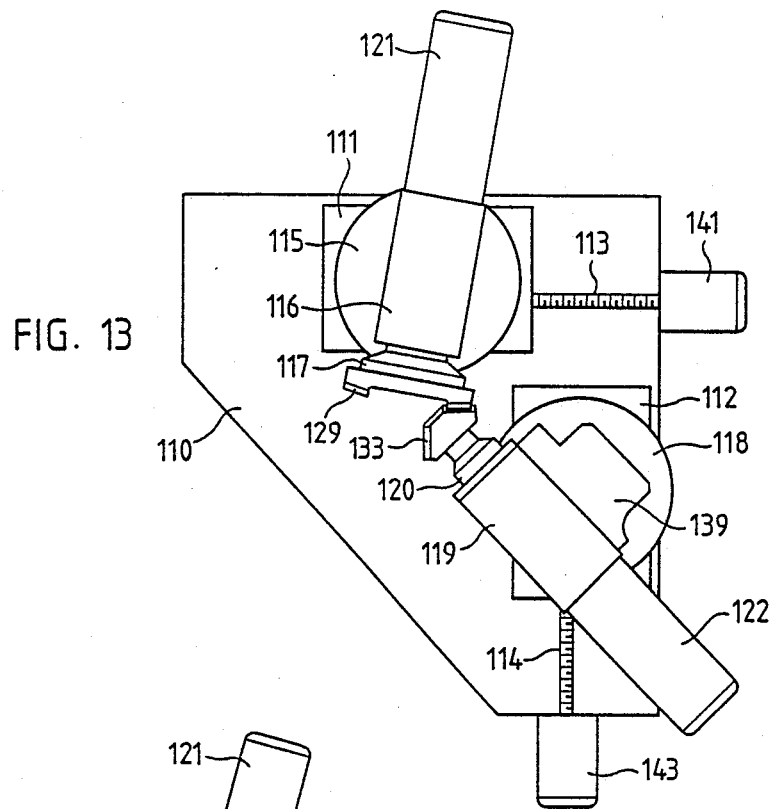
FIG. 13 shows a plan view analogous to that of FIG. 11 of the inventive apparatus arranged for grinding large crown gears for heavy vehicles.

The grinding machine is therefore preferably designed according to FIGS. 13 and 14 and the electric motor 122 on the turret 139 is employed as the master motor 122 and the electric motor 121 is employed as the slave motor 121 and also as the spindle 120 for accommodating the predominantly more rapidly rotating pinion, whether tool or workpiece.

The so-called "electric shaft" can be digital-controlled or analog-controlled. Digital control is preferably employed for this grinding machine. When digitally controlled, the master motor, for instance the electric motor 122, generates pulses during its rotation which are exploited for controlling the slave motor, for instance the electric motor 121. For each pulse emitted by the pulse transducer 146, the master motor 122 rotates through an angle $\alpha_1$ and causes the slave motor 122 to rotate through a related angle $\alpha_2$. The following relationships obtain:

$$\frac{\alpha_1}{\alpha_2} = \frac{Z_2}{Z_1} = \frac{\alpha_{act}}{\alpha_{ref}},$$

wherein:

$Z_1$ = number of teeth of the gear driven by the master motor 122;

$Z_2$ = number of teeth driven by the slave motor 121;

$\alpha_{act}$ = actual angular displacement of the master motor 122; and $\alpha_{ref}$ = reference angular displacement for the slave motor 121.

In this controller, it is essential that a tooth of the workpiece or of the tool be situated in a predetermined position, for example exactly in the middle of a tooth gap of the conjugate gear. If the tool and the workpiece are brought into mesh, one tooth of the tool must therefore be correspondingly positioned, for instance in a tooth gap of the workpiece, for instance must be centered therein. There are various procedures for this positioning or centering which can be performed with or without a digitally controlled so-called "electric shaft". Procedures, preferably for centering, will be described in detail in the following in relation to FIGS. 13 and 19. Before the actual positioning or centering, the tool and the workpiece must be brought into position such that tooth can no longer encounter tooth. It is further prerequisite that the control means for this procedure be predominantly integrated in the controller 147.

According to a first illustrative embodiment, centering is performed with stationarily meshed gears. The pulse transducer 146, which is also designated as an incremental rotational stepper transducer, is employed as a contact transducer of the master motor 122. Such a pulse transducer has a high resolution of, for instance, one pulse per 1/1000 of a degree of rotation. The slave motor 121 is rotated until both gears touch, i.e. until their tooth flanks enter into contact, when the pulse transducer 146 of the master motor 122 transmits a pulse to the controller 147. Thereupon the slave motor 121 is rotated in the opposite direction until the gears touch once again, i.e. until their opposite tooth flanks enter into contact, and the pulse transducer 146 of the master motor 122 transmits another pulse. Subsequently, the direction of rotation of the slave motor 121 is reversed again and the slave motor 121 is rotated by a half of the previous amount so that a tooth of one gear is situated exactly in the middle of a tooth gap of the other gear. Should the predeterminate definitive position be, for instance, situated not exactly in the middle, the slave motor 121 is positioned by a correspondingly different amount.

According to a second illustrative embodiment, centering is performed with rotating meshed gears. As long as both gears rotate without touching, i.e. with bilateral play between their tooth flanks, the lag between the master motor 122 and the slave motor 121 will be relatively small. It will be understood that the lag is the difference between the reference value for and the actual value of the position of the slave motor 121. As soon as both gears touch, however, this lag is altered, since the slave motor 121 only delivers the torque necessary for rotating its associated gear alone. The alteration of the lag is evaluated in the controller or controller circuit 147 for centering a tooth of one gear in the tooth gap of the other gear analogous to the above-described illustrative embodiment.

According to a third illustrative embodiment, centering is also performed with rotating meshed gears. The contact of both gears is recognized by a microphone. The impact of one tooth flank on the adjacent tooth flank generates acoustic waves which can be evaluated for centering the gears in the described manner.

According to a fourth illustrative embodiment, the workpiece 129 is not braked. One of the teeth of the tool 133 connected to the master motor 122 is inserted into a tooth gap of the workpiece 129. As soon as a tooth flank of the tool 133 touches a tooth flank of the tooth gap of the workpiece 129, a torque is generated by this contact with the unbraked workpiece 129. This torque is measured by a torque transducer. This contact-generated torque, in turn, generates a pulse which causes the master motor 122 and the tool 133 to begin to rotate until the other tooth flank of the tool touches the other flank of the tooth gap of the workpiece. During this rotation, the master motor 122 or the slave motor 121 generates in the pulse transducer 146 a further number of pulses which are counted. As soon as the other flank of the tooth of the tool 132 touches the other flank of the tooth gap of the workpiece 129, a counteracting torque is generated and the master motor 122 is reversed in its direction of rotation and rotated back by half of the counted pulses. Thus one tooth of the tool is situated exactly in the middle of a gap of the workpiece.

The behavior of a so-called "electric shaft", i.e. of an electronic transmission, is considered to be well-known in the art. The associated regulation technology can be refined to the extent desired, so that the requisite coincidence of the angular displacement of the tool shaft and the workpiece shaft is attainable, especially since when grinding, i.e. finish machining bevel gears considerably smaller force fluctuations arise than when cutting, i.e. rough machining bevel gears. Since the slave motor 121—which is incrementally driven by the master motor 122 through the electronic controller 147—must set a relatively great mass into motion, namely the shaft and the gear, oscillations of this mass are inevitable. These oscillations are, however, largely damped by the grinding process and can even have beneficial effects.

The regulation technology usual in "electric shafts" can be improved in that, for instance, a supplementary adaptive regulator is employed having a variable amplification of the rotary speed function. Additionally, a so-called "observer regulator" can be employed if regulating algorithms are implemented.

The mode of operation of the grinding apparatus will now be explained in relation to FIG. 13:

First the workpiece 129 is mounted on the spindle 117 and the tool 133 is mounted on the spindle 120. Subsequently, a tooth of the tool 133 is positioned for centered in a tooth gap of the workpiece 129 in one of the manners described hereinbefore and the master motor 122 and the slave motor 121 are allowed to run free at full speed, the tool 133 and the workpiece 129 having been so arranged in relation to one another that their teeth do not touch during the acceleration of the tool 133 and the workpiece 129 to their fully rotary speeds. This is essential, since in the acceleration phase an undesirably great lag between the master motor 122 and the slave motor 121 can arise. Only when the full rotary speeds of the master motor 122 and of the slave motor 121 have been attained are the tool 133 and the workpiece 129 advanced into the grinding or finish machining position. The workpiece 129 is now ground or abraded, i.e. finish machined, at full rotary speed with a predetermined feed motion. Before the rotary speeds of both motors 121 and 122 are subsequently reduced, the tool 133 and the workpiece 129 are preferably disengaged from mesh. This is also essential, since an undesirably great lag can also arise in the deceleration phase.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. An apparatus for finish machining tooth flanks of a number of longitudinally curved teeth of a rough machined bevel gear blank for a hypoid bevel gear pair, comprising a ring gear and a pinion gear, by means of a rotary form tool, comprising:

a machine bed;
two slides arranged on said machine bed to be translatable toward one another;
a first spindle having a lengthwise axis and serving for mounting the rough machined bevel gear blank defining a workpiece arranged on one of said two slides;
a second spindle having a lengthwise axis and serving for mounting the rotary form tool and arranged on the other of said two slides;
said slides constituting means for translatably adjusting said first spindle and said second spindle;
a separate electric motor arranged coaxially with respect to each of said two spindles for respectively driving the rotary form tool and the workpiece at a first and a second speed of rotation, respectively;
means defining an electric shaft;
said separate electric motors being mutually interconnected by said electric shaft, for synchronizing said first and said second speed of rotation in a predetermined ratio;
said slides each comprising a rotary table with a housing for journalling a respective one of said two spindles and a therewith associated one of said separate electric motors;
said rotary tables each having an axis of rotation;
at least one housing of said housings being mounted on one of said rotary tables to be translatable in relation to said axis of rotation of the associated rotary table;
said rotary tables each being rotatable such that there can be selectively adjusted the angle between the lengthwise axes of the first and second spindles;
one of said spindles being arranged such that the lengthwise axis thereof intersects the axis of rotation of the associated rotary table; and
the other of said spindles being arranged such that the lengthwise axis thereof is arranged offset with respect to the axis of rotation of the associated rotary table.

2. The apparatus as defined in claim 1, wherein:

one motor of said separate electric motors is arranged in said at least one housing which is translatable;

said one motor being structured as a motor motor;

one other motor of said separate electric motors being arranged in one other of said housings;

said one other motor being structured as a slave motor;

one spindle of said two spindles being driven by said master motor; and said one spindle normally carrying the pinion gear selectively constituted by the workpiece or the rotary form tool.

* * * * *